United States Patent [19]

Erickson

[11] 4,287,170

[45] Sep. 1, 1981

[54] NITROGEN AND OXYGEN VIA CHEMICAL AIR SEPARATION

[76] Inventor: Donald C. Erickson, 1704 S. Harbor La., Annapolis, Md. 21401

[21] Appl. No.: 127,728

[22] Filed: Mar. 6, 1980

[51] Int. Cl.³ ............................................. C01B 13/00
[52] U.S. Cl. ...................................... 423/579; 423/219
[58] Field of Search ................ 423/579, 219, 262, 351

[56] References Cited

U.S. PATENT DOCUMENTS

| | | | |
|---|---|---|---|
| 2,418,402 | 4/1947 | Gorin | 423/579 |
| 2,490,587 | 12/1949 | Fontana et al. | 423/579 |
| 3,579,292 | 5/1971 | Mullhaupt et al. | 423/579 |
| 3,856,928 | 12/1974 | Tarman et al. | 423/579 |
| 3,980,763 | 9/1976 | Mullhaupt | 423/579 |
| 4,132,766 | 1/1979 | Erickson | 423/579 |

OTHER PUBLICATIONS

Moriarty, Jr., "The Effects of Catalytic or Promoter Oxides on the Brin Process," Iowa Academy of Sciences Proceedings, vol. 77, 4/10/71, pp. 360-378.

*Primary Examiner*—Earl C. Thomas
*Assistant Examiner*—Wayne A. Langel

[57] ABSTRACT

A chemical process for separating air into both oxygen and purified nitrogen is disclosed. Bulk oxygen removal is accomplished using an oxygen acceptor such as molten alkali nitrite solution, SrO, or Pr-Ce oxides. The remaining oxygen is removed by reaction with a scavenger such as MnO or others. The oxidized scavenger is regenerated by a reducing gas, and the heat released by the combined scavenging reactions is used to furnish at least part of the energy required by the acceptor process.

9 Claims, 2 Drawing Figures

NITROGEN AND OXYGEN VIA CHEMICAL AIR SEPARATION

DESCRIPTION

1. Technical Field

This invention relates to processes wherein air is separated into oxygen and nitrogen by using one or more reversible or regenerable chemical reactions as the means of separation.

2. Background Art

Many condensed phase materials will reversibly react with gaseous oxygen to form condensed phase oxides. In accordance with the laws of chemical equilibrium, an equilibrium oxygen partial pressure is thus defined which is a function both of temperature and the condensed phase activities. When the equilibrium oxygen partial pressure falls in the approximate range of 0.01 atmosphere to 10 atmospheres, and if the kinetics of both the oxidation reaction and its reverse are acceptably rapid, then the material is called an "oxygen acceptor." In use, oxygen acceptors are first contacted with air or other oxygen containing gas under conditions such that their equilibrium oxygen pressure is less than the oxygen partial pressure in the air, which causes the oxygen to chemically react with (or be "absorbed" or "accepted" by) the oxygen acceptor until the two oxygen pressures are almost equal. Then the oxidized acceptor is exposed to conditions wherein its equilibrium oxygen pressure is greater than the prevailing gaseous oxygen pressure, which causes decomposition to the original acceptor plus oxygen gas.

In conventional oxygen generation processes based on oxygen acceptors, reasonable levels of efficiency (i.e. energy consumption) can only be achieved if substantial quantities of oxygen are left in the nitrogen exhausting from the absorption reaction—anywhere from 5 to 40% of the incoming oxygen. Regardless of whether the process uses pressure swing (i.e. absorption pressure higher than desorption pressure), temperature swing (i.e. absorption temperature lower than desorption temperature), or any combination of the two, the more oxygen that is removed out of the incoming air, the larger each swing must be. As the level of $O_2$ absorption becomes more complete, the slight gains of added $O_2$ production become offset by the large energy requirements of cycling all the acceptor and/or all the incoming air through ever larger swings of pressure and/or temperature. Recently a family of liquid phase oxygen acceptors has been disclosed which have soluble liquid phase oxides—the alkali metal nitrites and nitrates. Solubility results in activities less than unity, and hence a new method of achieving the necessary acceptor $pO_2$—gas $pO_2$ shift between absorber and desorber has become available—a method which could be called "activity swing." This is achieved by conducting absorption in multiple countercurrent stages. Its effect is to reduce the required size of pressure and/or temperature swing, but it cannot eliminate the need for them. Hence the above characteristic still holds—a maximum $O_2$ generation efficiency is achieved with a substantial percentage of the incoming oxygen remaining in the exhaust nitrogen, anywhere from 5 to 40%, and as the remaining $O_2$ is decreased below the optimum, severe reductions in efficiency occur.

The amount of oxygen remaining in the absorber exhaust can be varied by the operator by varying the absorber and desorber pressures and temperatures and the relative flow rates of acceptor and air, as shown in the prior art. In some instances the residual oxygen content is used to burn a fuel, generating heat to drive the process.

Accordingly the chemical air separation processes have come to be known as processes for producing oxygen only. Their nitrogen product will contain from 1% to 6% oxygen or even more. Alternatively, if the nitrogen product is combusted with fuel in order to provide heat to drive the separation process, then $CO_2$ and $H_2O$ combustion products replace part of the residual oxygen. For many industrial applications of nitrogen, these impurities are just as harmful as oxygen.

There are known means for purifying nitrogen of several percent of oxygen and/or $CO_2$. However these carry a high energy and material cost for the levels of impurities under discussion. Cryogenic air separation plants can produce dry, $O_2$ and $CO_2$ free nitrogen directly at reasonable efficiency and without need for additional cleanup. With chemical air separation plants, even though they may be more efficient than cryogenic plants for oxygen production alone, the added cost necessary to achieve purified nitrogen makes the cryogenic plant the preferred route to purified nitrogen under current technology.

One objective of the present invention is to provide an efficient chemical air separation process which yields purified nitrogen as well as oxygen, or in some applications nitrogen only. Bulk oxygen removal (and also oxygen generation) is accomplished by an efficient acceptor process, driven by heat. Final oxygen removal from the nitrogen is accomplished by indirect combustion with a regenerable oxygen scavenger, which is normally considered inefficient. However by conducting scavenge at conditions such that its reject heat furnishes the heat necessary for the acceptor process, an overall efficiency much higher than previously attainable is achieved.

Known oxygen acceptor materials include BaO (Brin), $Na_2MnO_3$ (DuMotay), SrO, Hg, $CuCl_2$ (Mallet), Pr-Ce oxides, $Cr_2O_3$, $SrCrO_4$, solutions containing alkali metal nitrites and alkali metal peroxides, fluomine, salcomine, hemoglobin, and phosphinomanganese complexes. It is known to conduct oxygen generation processes based on oxygen acceptors in either batch or continuous mode. It is known to apply the thermal energy input necessary to drive an oxygen acceptor process to heat either the incoming air or the oxidized acceptor or both.

Documents referred to in the preparation of this disclosure include U.S. Pat. Nos. 3,980,763, 4,132,766, 4,165,972, 3,361,531, 3,852,406, 3,579,292, 1,050,902, and the Patent Cooperation Treaty application PCT/U.S. No. 78-00149 filed by present applicant on Nov. 16, 1978. Reduction of an alkali sulfate containing molten salt to alkali sulfide by reducing gas is described in Atomics International Report AI-70-5, "Development of a Molten Carbonate Process for Removal of Sulfur Dioxide from Power Plant Stack Gases, Part I Process Chemistry Reduction," October 1968, Canoga Park, CA.

DISCLOSURE OF INVENTION

A chemical air separation process is disclosed which yields, in addition to the oxygen rich product normally associated with such processes, also a nitrogen-argon mixture which is substantially free of oxygen. The nitrogen-argon proportionality is that of the air supply, i.e. approximately 80 to 1. By using the following procedure, it is possible to obtain the nitrogen-argon mixture without the expenditure of substantively more energy than that required to run the oxygen production part of the process alone.

The air is contacted with an oxygen acceptor at a temperature such that between 60 and 95% of the oxygen is extracted by reaction with the acceptor. Then at least part of the resulting oxygen depleted air is contacted with an excess of oxygen scavenger which reacts with substantively all the contained oxygen, leaving a nitrogen-argon mixture. The exothermic reaction heat of the oxygen scavenging reaction is thus added to the nitrogen-argon mixture, raising its temperature at least 50 K. above that of the supplied oxygen depleted air. The hot nitrogen-argon mixture then provides the thermal driving head (i.e. heat input) necessary to enable the oxygen acceptor absorption and decomposition reactions to continue without losing temperature. This is done by exchanging it against the air supply and optionally also against the oxidized acceptor which is undergoing decomposition in order to produce oxygen and regenerate the oxygen acceptor. The oxidized oxygen scavenger is regenerated, i.e. reduced, by reacting with a reducing gas such as methane, hydrogen, CO, or other gaseous hydrocarbons, or mixtures thereof. The process cycle is completed by recycling regenerated oxygen acceptor to further contact with air and recycling regenerated oxygen scavenger to further contact with oxygen depleted air.

BEST MODE FOR CARRYING OUT THE INVENTION

Figure 1:
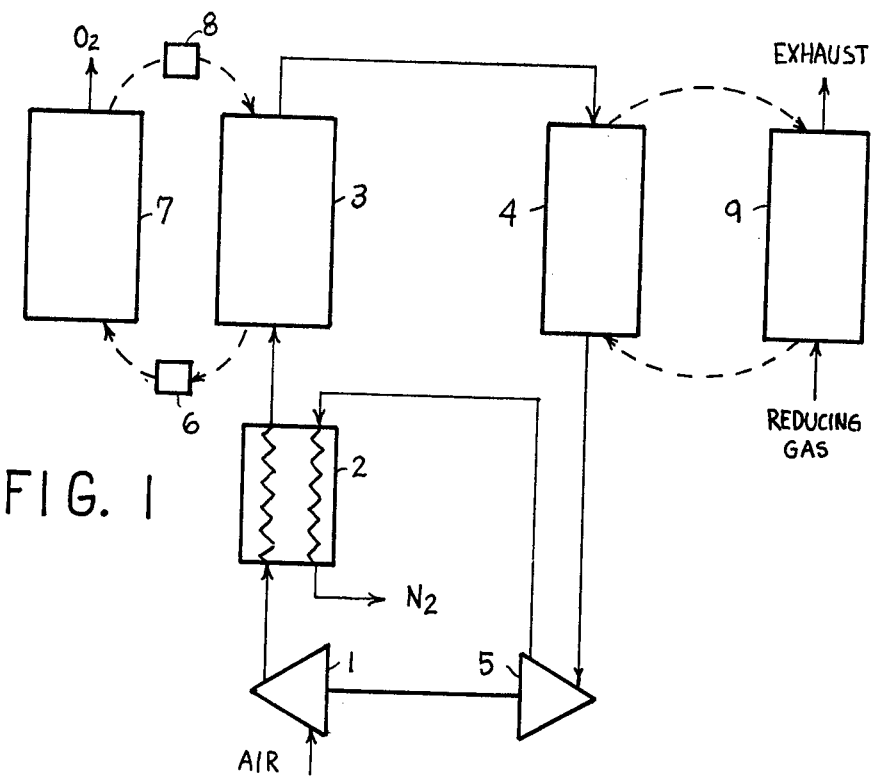
FIG. 1 is a schematic flowsheet indicative of how a solid oxygen acceptor material and a solid oxygen scavenger material may be applied in the disclosed process.

The oxygen scavenger must satisfy several important criteria at its temperature of use. The equilibrium oxygen partial pressure it establishes with its oxide must be less than approximately $10^{-3}$ atmospheres, in order to ensure a sufficient degree of oxygen removal from the absorber exhaust. The oxidized scavenger should be reducible by reducing gas, with good reducing gas utilization, e.g. greater than 60%. This requirement sets a lower limit on the equilibrium $pO_2$ of approximately $10^{-16}$ atmospheres at 1100 K., since at lower values reducing gas would not effectively reduce the oxidized scavenger. For example, aluminum would not be a satisfactory scavenger in this process, because reducing gas will not effectively reduce $Al_2O_3$. The equilibrium $pO_2$ of $Al$—$Al_2O_3$ at 1100 K. is approximately $10^{-40}$ atmospheres. Equilibrium $pO_2$ values of other candidate scavengers can be ascertained from Ellingham diagrams with Richardson nomograms, e.g. T. B. Reed, "Free Energy of Formation of Binary Compounds," MIT Press, 1971, Boston. The equilibrium $pO_2$ decreases markedly as temperature decreases, both for scavengers and for acceptors. This is the major distinction between scavengers and acceptors-acceptors have an equilibrium $pO_2$ at the temperature of use in the range of $10^{-2}$ to $10^{+1}$ atmospheres, whereas scavengers have an equilibrium $pO_2$ below $10^{-3}$ atmospheres. Note that some materials which are acceptors at high temperatures can also be scavengers at lower temperatures. However most known acceptors are not regenerable by reducing gas due to their tendency to form carbonates and/or hydroxides in the presence of combustion products.

The kinetics of both the oxidation and reduction reactions which the scavenger undergoes should be acceptably rapid. Also the scavenger should be durable and resistant to attrition due to dusting, spalling, vapor phase loss, poisoning, and the like.

The net result of the two reactions undergone by the scavenger - oxidation by absorber exhaust and then reduction by reducing gas—is the same as direct reaction between the two gases, with respect to energy release. This is because there is no net change to the scavenger. Its role is that of a chemical intermediate, allowing the two gases to react without coming into direct contact. Thus the full heating value of the reducing gas is realized as sensible heat of the product gases (the nitrogen-argon mixture and the combustion exhaust), and hence is available at a high enough temperature to supply the needs of the oxygen acceptor part of the process. Both the amount of oxygen left in the absorber exhaust and the amount of reducing gas supplied therefore determine the temperature rise of these gas streams, which should be greater than approximately 50 K.

Oxygen scavenger-oxidized scavenger pairs which meet the above criteria include the following: $Cu$-$Cu_2O$; $Cu_2O$-$CuO$; $FeO$-$Fe_3O_4$; $Fe_3O_4$-$Fe_2O_3$; $Ni$-$NiO$; $Co$-$CoO$; $CoO$-$Co_3O_4$; $MnO$-$Mn_3O_4$; $Mn_3O_4$-$Mn_2O_3$; $MoO_2$-$MoO_3$; $V_8O_{15}$-$VO_2$; $VO_2$-$V_2O_5$; $Sb$-$Sb_2O_3$; $Cr_2O_3$-$CrO_2$; $Pb$-$PbO$; $Bi$-$Bi_2O_3$; and molten alkali salt solutions containing less than about 10% of alkali sulfide and alkali sulfate. At higher temperatures, e.g. 1000 K. to 1200 K., MnO and the molten alkali salt solution have been found to give particularly advantageous service as oxygen scavengers. Also melts containing two or more of Pb, Bi, and Sb plus a molten oxide phase have advantageous properties.

As is evident from the foregoing, both the acceptors and the scavengers are available in both liquid and solid phases. Any combination of use is contemplated i.e. solid acceptors can be used in conjunction with either solid or liquid scavengers, and similarly for liquid acceptors. Liquid phase materials are frequently preferred in continuous systems due to their ease of transport via pumps or other known means. Solids are frequently encountered in fixed bed, batch type of operations, with several beds being provided to maintain continuous overall operation. This does not exclude solids however from continuous bed operations when suitable means of transport are employed, e.g. screw conveyors, fluidized transport, rotary solids transport reactors, lock hoppers, and the like.

FIG. 1 illustrates the combination of solid acceptor plus solid scavenger. The acceptor can be SrO at approximately 600 K., Pr-Ce oxide at 700 K., or other known compositions, including the promoters described in the prior art. The scavenger can be MnO, Cu, or FeO or others, operating between 50 K. and 500 K. hotter than the acceptor, for example between 800 K. and 1300 K. Incoming air is compressed to between 2 and 30 atmospheres in compressor 1, then heated in heat exchanger 2 and introduced into absorber 3 where it contacts the acceptor. The oxygen depleted absorber exhaust, still containing between 5 and 40% of the original oxygen content, is then introduced into scavenger vessel 4, at approximately the same pressure as the absorber, where it is contacted by an excess of scavenger so as to remove substantially all oxygen. The gaseous exhaust, a nitrogen-argon mixture, is then expanded through pressure recovery device 5, such as a turboexpander, thereby producing at least part of the mechanical energy necessary to drive compressor 1. Then it is used to heat incoming air in heat exchanger 2. The oxidized acceptor from absorber 3 is transported through a means for maintaining a pressure boundary in a gas-solid system such as a lockhopper 6, to the desorber 7, where the lower pressure, in the range of 0.05 to 2 atmospheres, causes it to decompose releasing oxygen. The regenerated acceptor is transported through lockhopper 8 back to the absorber 3. Similarly, the oxidized scavenger in vessel 4 is transported to the reducer vessel 9, where it is reduced by a reducing gas and then returned to the scavenger vessel. Since the scavenge and reduction reactions can conveniently be conducted at approximately the same pressures, the lockhopper type devices are not required in that loop, although they are not excluded. The dashed lines signify transport of solid phase materials. It will be apparent that batch operation can be substituted for the illustrated continuous operation by providing gas switchover valves and manifolds in lieu of the lockhoppers or solids transport means.

Figure 2:
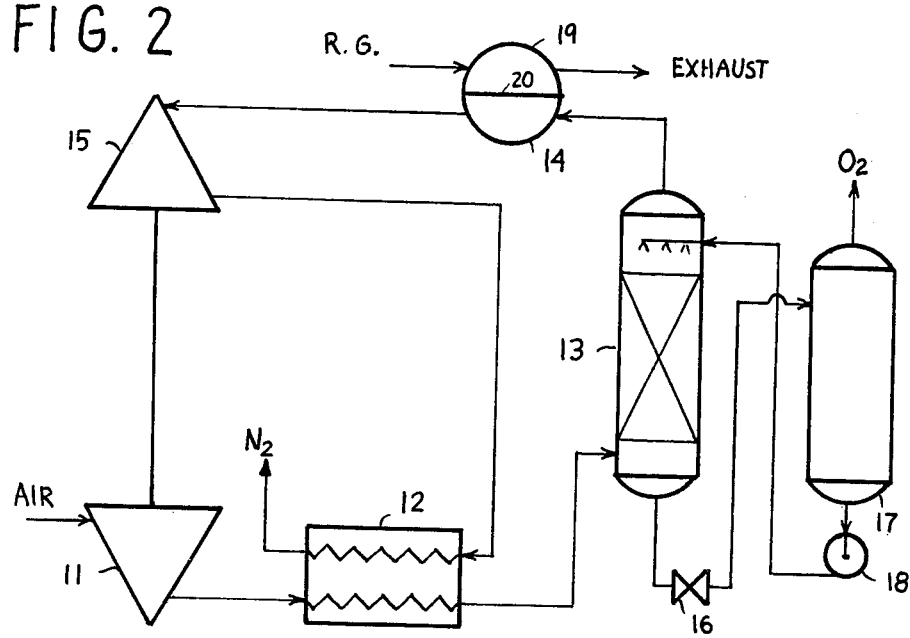
FIG. 2 similarly illustrates the use of liquid phase acceptor and scavenger.

FIG. 2 illustrates the combination of liquid phase acceptor and liquid phase scavenger. The acceptor can be comprised of alkali metal nitrate and nitrite. The scavenger can be an alkali metal carbonate solution containing essentially between 3% and 15% combined content of alkali sulfide and alkali sulfate. Both the scavenger and acceptor can also contain up to 20% alkaline earth cations in each melt. Incoming air is compressed in compressor 11, heated in heat exchanger 12, and contacted with the liquid acceptor in multistage countercurrent reactor 13. The absorber exhaust is then contacted with the scavenging melt in the scavenging zone 14. The resulting hot nitrogen rich gas is then expanded through turboexpander 15 and used to heat incoming air in heat exchanger 12. The oxidized acceptor is reduced in pressure in pressure reduction device 16 and transported to desorber 17, where oxygen rich gas is generated and the acceptor is regenerated. The acceptor is then transported via pressure increase device 18 such as a pump back to absorber 13. Oxidized scavenger in scavenging zone 14 is transported to reduction zone 19 where it is regenerated by reaction with reducing gas, and then it is recycled. The scavenging and reduction zones can be arranged in a single vessel having a baffle 20 which defines two separate gas spaces, where the liquid below the baffle is in communication and serves to seal the respective gas spaces.

The transport of liquid under the baffle can be achieved by injecting the gaseous reactants tangentially, thereby imparting a rotary motion to the melt. Alternatively separate reactors and conventional pumped transport could be used, as with the acceptor.

The sulfate content of the melt will increase in the scavenge zone and the sulfide content will increase in the reduction zone. By limiting the total sulfur species concentration, the $SO_2$ concentration in the nitrogen-argon mixture will be less than 1 ppm, and the $H_2S$ concentration in the combustion exhaust will not exceed several hundred ppm. The combustion exhaust will also have some residual unreacted reducing gas, i.e. $H_2$ and CO. Thus sufficient oxygen containing gas should be added to it to fully oxidize it to $SO_2$, $H_2O$ and $CO_2$. By keeping the sulfate to sulfide ratio greater than approximately one in the reduction zone, The amount of unreacted reducing gas will be minimized. If the reducing gas is relatively pure hydrogen, the melt solvent will be predominantly alkali hydroxide, whereas any substantive carbonaceous content in the reducing gas changes it to alkali carbonate. In either case measurable amounts of $H_2O$ or $CO_2$ will be found in the nitrogen-argon mixture—as much as 1000 ppm depending on temperature and salt cation mix.

An alternative liquid phase scavenger material which does not involve sulfur species or introduce trace $CO_2$ or $H_2O$ into the nitrogen is the two phase melt of heavy metals plus their oxides. By using two or more of Pb, Bi, and Sb the temperature can be kept below 1100 K., and hence the vapor phase loss can be kept below 1 ppm. Being two phase, this melt also has the advantage of gravity transport: that is, when oxidized scavenger forms, it automatically floats up to the oxide phase, and when reduction occurs in the oxide phase, the regenerated scavenger automatically sinks back to the metal phase. Any Bi present concentrates in the oxide phase, which is advantageous both in keeping the melting point and vapor pressure low.

The flowsheets are highly simplified in order to illustrate only the underlying concept of the disclosed process. Many possible modifications will be apparent within the scope of the disclosure: heat exchange can occur before in lieu of after expansion; part or all of the indirect heat exchange can be with the oxidized acceptor in reactors 9 or 19; additonal compressors, expanders, heat exchangers, etc. may be present. The absorber exhaust stream can be divided, with only part of it being reacted with scavenger so as to raise the temperature. One modification of interest is when it is desired to produce the nitrogen-argon mixture at elevated pressure, e.g. above 5 atmospheres. In that case it would not be expanded to recover compression energy, and hence more of its energy is recoverable as sensible heat. Thus a lower temperature increase over the absorber exhaust temperature is called for, and a correspondingly lesser amount of reducing gas need be used. This results in the production of pressurized nitrogen using markedly less energy than that required by current technology.

If desired, known techniques such as membrane separation, molecular sieve separation, etc. can be used to separate the argon from the nitrogen.

Scavenger is preferably supplied to the scavenge reaction at a rate in excess of the rate which provides the stoichiometric amount to react with the supplied oxygen, in order to ensure substantially complete oxygen removal, i.e. reducing it below 1000 ppm.

The extent of oxygen absorption in the absorber is a complex function of the absorber temperature and pressure, the composition and temperature of the supplied acceptor, and the relative supply rates of acceptor and air. The objective of absorbing a specified percentage of oxygen amounts to reducing the $pO_2$ of the absorber exhaust to within a specified range, and this is done by ensuring that the equilibrium $pO_2$ of the acceptor last contacted by the gas before its exit from the absorber is also in that range. Accordingly to the laws of eqilibrium, the equilibrium $pO_2$ of the acceptor is established by its composition and temperature. The composition of the acceptor in contact with exiting absorber exhaust is determined by entering acceptor composition plus relative gas-solid flow rates. The required control strategy will be apparent to artisans experienced in the operation of continuous flow regenerative systems.

Both the acceptors and the scavengers can be in pure or mixed form. Either can also be mounted in an inert carrier or support material, e.g. alumina, to improve durability, transport characteristics, and thermal cycling resistance.

Purified nitrogen-argon mixture is useful in metallurgical applications, glass making, food processing, tertiary oil recovery, and elsewhere.

As a numerical example, 100 gram moles per second (i.e. 100 units) of air is dried and compressed to 8 atmospheres. It is heated above 800 K. and then contacted with 1300 units of alkali salt mixture having a nitrate to nitrate ratio between 5 to 20 and having at least 1% total dissolved oxides. The absorber has at least two countercurrent stages. 17 units of oxygen reacts with the salt, at a temperature of 800 K. to 1000 K. Thus 81% of the oxygen is absorbed, and the absorber exhaust gas contains 4.8% oxygen. The nitrate content of the salt increases and nitrite content decreases by approximately 34 units. One half of the absorber exhaust gas is then reacted with MnO supplied in stoichiometric excess, reducing its oxygen content to below 1 ppm. Indirect cooling is supplied to the scavenge reaction to prevent the temperature from exceeding 1300 K. The remainder of the absorber exhaust can be used to provide the cooling, thereby being heated above 1100 K. Then both thermal and compression energy is recovered from both gas streams, by expanding them against the incoming air and also optionally against the salt in the desorber reactor. The desorber reactor generates oxygen at 0.55 atmosphere. Reducing gas is supplied to reduce oxidized scavenger at a rate of 8.5 units of CO plus $H_2$, 2.125 units of $CH_4$, or any linear combination of the two. For each kg of oxygen and 1.6 kg of pure nitrogen product, the net energy requirement, measured in terms of the heating value of the reducing gas supplied to the scavenger reduction reaction, is 1.6 megajoules.

I claim:

1. A chemical process for separating air into oxygen and a nitrogen-argon mixture substantially free of oxygen comprising:
   a. contacting the air with an oxygen acceptor under conditions such that between 60% and 95% of the oxygen is absorbed by the acceptor, whereby oxidized acceptor and oxygen depleted air is obtained;
   b. separately decomposing the oxidized acceptor to yield oxygen and regenerate the oxygen acceptor;
   c. contacting at least part of the oxygen depleted air with an excess of oxygen scavenger, whereby the scavenger is oxidized and the nitrogen-argon mixture substantially free of oxygen is obtained, and wherein the exothermic heat of the oxidation reaction causes the nitrogen-argon mixture temperature to be at least 50 K. higher than the oxygen depleted air temperature;
   d. separately regenerating the oxidized oxygen scavenger by reduction with a reducing gas;
   e. transferring heat by indirect heat exchange from the nitrogen-argon mixture to at least one of the air and the oxidized acceptor;
   f. recycling regenerated acceptor to additional air contact and regenerated scavenger to addition oxygen depleted air contact.

2. The process according to claim 1 wherein the oxygen scavenger and its oxide have an equilibrium oxygen partial pressure in the range of $10^{-3}$ to $10^{-16}$ atmospheres.

3. The process according to claim 2 wherein the scavenger is MnO, Cu, $Cu_2O$, or FeO.

4. The process according to claim 2 wherein the scavenger is a melt containing at least two of Pb, Bi, and Sb, and having a fused oxide.

5. The process according to claim 1 wherein the scavenger is a molten alkali salt solution consisting essentilly of between 3% and 15% combined alkali sulfide and sulfate, and wherein the sulfate to sulfide ratio is maintained above 1.

6. The process according to claims 2, 4, 5 wherein the oxygen acceptor is a molten alkali salt solution consisting essentially of nitrate and nitrite and at least 1% total oxides.

7. The process according to claim 1 wherein at least part of the compression energy of the nitrogen-argon mixture is recovered by expanding it so as to perform work.

8. The process according to claim 1 wherein the oxygen acceptor is comprised of Pr-Ce oxides or SrO.

9. A continuous process for the production of nitrogen substantially free of oxygen from a nitrogen and oxygen containing gas comprising:
   a. contacting the gas with an oxygen acceptor so as to remove between 60% and 95% of the oxygen from the gas;
   b. contacting the oxygen depleted gas from step (a) with an oxygen scavenger so as to remove substantially all remaining oxygen and to generate heat;
   c. indirectly transferring said heat to said nitrogen and oxygen containing gas,
   d. regenerating the oxidized scavenger by reduction with a reducing gas and recycling it to additional oxygen depleted gas contact;
   e. regenerating and recycling the scceptor to additional gas contact.

* * * * *